United States Patent [19]
Bidner et al.

[11] Patent Number: 5,515,832
[45] Date of Patent: May 14, 1996

[54] METHOD OF CONTROLLING INTERNAL COMBUSTION ENGINE EXHAUST HYDROCARBONS

[75] Inventors: David K. Bidner, Madison, Wis.; Michael J. Cullen, Northville, Mich.

[73] Assignee: Ford Motor Company, Dearborn, Mich.

[21] Appl. No.: 270,626

[22] Filed: Jul. 5, 1994

[51] Int. Cl.$^6$ .................................................. F02M 25/07
[52] U.S. Cl. ............................................................ 123/571
[58] Field of Search ................................. 123/568, 569, 123/570, 571, 585

[56] References Cited

U.S. PATENT DOCUMENTS

| | | | |
|---|---|---|---|
| 3,254,484 | 6/1966 | Kopper | 60/278 |
| 4,357,917 | 11/1982 | Aoyama | 123/568 |
| 4,732,116 | 3/1988 | Tanahashi et al. | 123/568 |
| 4,875,455 | 10/1989 | Hashimoto et al. | 123/568 |
| 4,945,870 | 8/1990 | Richeson | 123/568 |
| 5,048,470 | 9/1991 | Geddes et al. | 123/52 MB |
| 5,060,271 | 10/1991 | Geddes | 381/71 |
| 5,136,517 | 8/1992 | Cullen et al. | 364/431.05 |
| 5,224,460 | 7/1993 | Havstad et al. | 123/568 |
| 5,329,912 | 7/1994 | Matsumoto et al. | 123/568 |

*Primary Examiner*—Willis R. Wolfe
*Attorney, Agent, or Firm*—Mark L. Mollon; Roger L. May

[57] ABSTRACT

A method for reducing hydrocarbon emissions exhausted from an internal combustion engine includes timing the opening and closing of valved intake and exhaust ports to overlap for a predetermined time period, and introducing at least one of a pressure decrease at the intake passage during said overlap and a pressure increase in said exhaust passage during said overlap to reduce late hydrocarbon emissions during the overlap. Preferably, a pressure transducer such as an acoustic transducer may be driven to provide an increased pressure pulse at the exhaust port during the overlap period. Alternatively, a preferred implementation of reduced pressure at the intake port includes the operation of a throttle bypass valve that reduces fluid flow to the intake port. Either or both of the pressure increase at the exhaust port and pressure decrease at the intake port during the valve overlap may be employed in practicing the present invention, and the pressure change may be signalled in response to at least one of the signals sensed or controlled by the electronic engine control module employed in operating the internal combustion engine.

14 Claims, 2 Drawing Sheets

METHOD OF CONTROLLING INTERNAL COMBUSTION ENGINE EXHAUST HYDROCARBONS

FIELD OF THE PRESENT INVENTION

The present invention generally relates to controls for the combustion fluids of internal combustion engines and, more particularly, to controls for the pressure and timing of fluid flow through a cylinder.

BACKGROUND ART

Previously known internal combustion engines, particularly reciprocating piston type internal combustion engines, are well known to include at least one valved intake port providing fluid communication between each cylinder and an intake passage, as well as at least one valved exhaust port providing fluid communication between each cylinder and the exhaust passage. Since pressure variations at the port may lag behind the time at which the piston reaches a top dead center (TDC) or bottom dead center (BDC) position when the port should theoretically open or close, valve opening and closing may be delayed a sector of crankshaft rotation occupying a finite crank angle duration. This valve overlap permits the intake valve to open the intake port while the exhaust valve also opens the exhaust port. This overlap of the valve openings has been found useful to increase the horsepower available from the internal combustion engine.

Recent regulations to control the emission of unburnt hydrocarbons and other emissions have prompted increased scrutiny of the fluid flowing through the ports and the cylinder. Some studies have indicated that a high concentration of hydrocarbon emissions during the final moments at which the exhaust port is open before closing. One of the causes believed to contribute to high concentration of hydrocarbons released during the final moments of exhaustion from the cylinder is the de-absorption of hydrocarbons from the oil and fuel coating on the cylinder walls which can absorb the hydrocarbons as they are introduced to the cylinder. In addition, the high pressures created in the cylinder, particularly due to combustion, can also increase the absorption of hydrocarbons in the lubrication boundary layer of the cylinder. As a result, these hydrocarbons may not be released until the end of the exhaust stroke when pressure has been substantially reduced in the cylinder and hydrocarbons can be de-absorbed to the exhaust gases. In addition, the rising of the piston in the cylinder toward the exhaust opening can produce a shovel effect in which the piston rings scrape the cylinder walls during the exhaust stroke to release hydrocarbons which are then pushed to the port and released at the end of the stroke. As a result, a benefit of increased horsepower by overlapping the opening of the intake and exhaust ports may be accompanied by an increase of late unburnt hydrocarbon emissions as the intake pressure forces additional fluid through the exhaust port during the valve overlap.

SUMMARY OF THE PRESENT INVENTION

The present invention overcomes the above mentioned disadvantages by reducing the amount of hydrocarbons emitted during the end of the period during which the exhaust valve remains open in a combustion cycle of an internal combustion engine. In general, pressure controls in the intake passage, the exhaust passage, or both during the overlap period can effectively retain or reinject hydrocarbons in the cylinder for combustion in the next combustion cycle. Accordingly, the present invention includes overlapping the opening and closing of the valve ports to improve the flow of air fuel mixture into the cylinder and the flow of exhaust or combustion products out of the cylinder, while introducing at least one of a pressure decrease in the intake passage at the intake port and a pressure increase in the exhaust passage at the exhaust port during the overlap to reduce the hydrocarbon emissions.

In the preferred embodiment, a pressure decrease at the intake passage may be conveniently provided by a control of the throttle bypass used to maintain sufficient fluid pressure for idle operation of the engine or, alternatively, by controlled movement of the throttle. Alternatively, the intake pressure decreases or exhaust pressure increases may be induced by acoustic or other wave energy. For example, an acoustic pulse delivered into the intake passage so as to provide a low or negative pressure pulse at the intake port could operate during the final stages of exhaust flow from the cylinder out the exhaust port. As an example, the preferred embodiment discloses an acoustic transducer arrangement for inhibiting the flow of exhaust gases from the cylinder by introducing a pressure pulse in the exhaust passage so that it arrives at the exhaust port at the later stage of exhaust gas release from the cylinder. Alternatively, a pressure increase in the exhaust passage may be provided by enhanced back pressure created in the exhaust passage during the final stage of exhaust gas release from the cylinder or control of the exhaust gas recirculation (EGR) mechanism.

As a result, the present invention provides a method for reducing late hydrocarbon emission exhausted from an internal combustion engine cylinder. In addition, the present invention provides an emission control apparatus for reducing the release of hydrocarbon emissions by properly phased excitations of an acoustic transducer or other pressure changing device whose output may be timed for arrival at the intake and exhaust ports, preferably during the valve overlap period. In addition, the present invention provides a high power internal combustion cycle that reduces emissions of hydrocarbons without sacrificing the high power efficiency available during valve overlap that compensates for time delayed fluid pressure lag at the ports. In addition, the present invention provides an internal combustion engine control that avoids increased hydrocarbon emissions normally associated with de-absorption and the shovel effect that both enhance late cycle release of unburnt hydrocarbons.

BRIEF DESCRIPTION OF THE DRAWING

The present invention will be better understood by reference to the following detailed description when read in conjunction with the accompanying drawing in which like reference characters refer to like parts throughout the views and in which.

DETAILED DESCRIPTION OF THE PREFERRED EMBODIMENT

Figure 1:
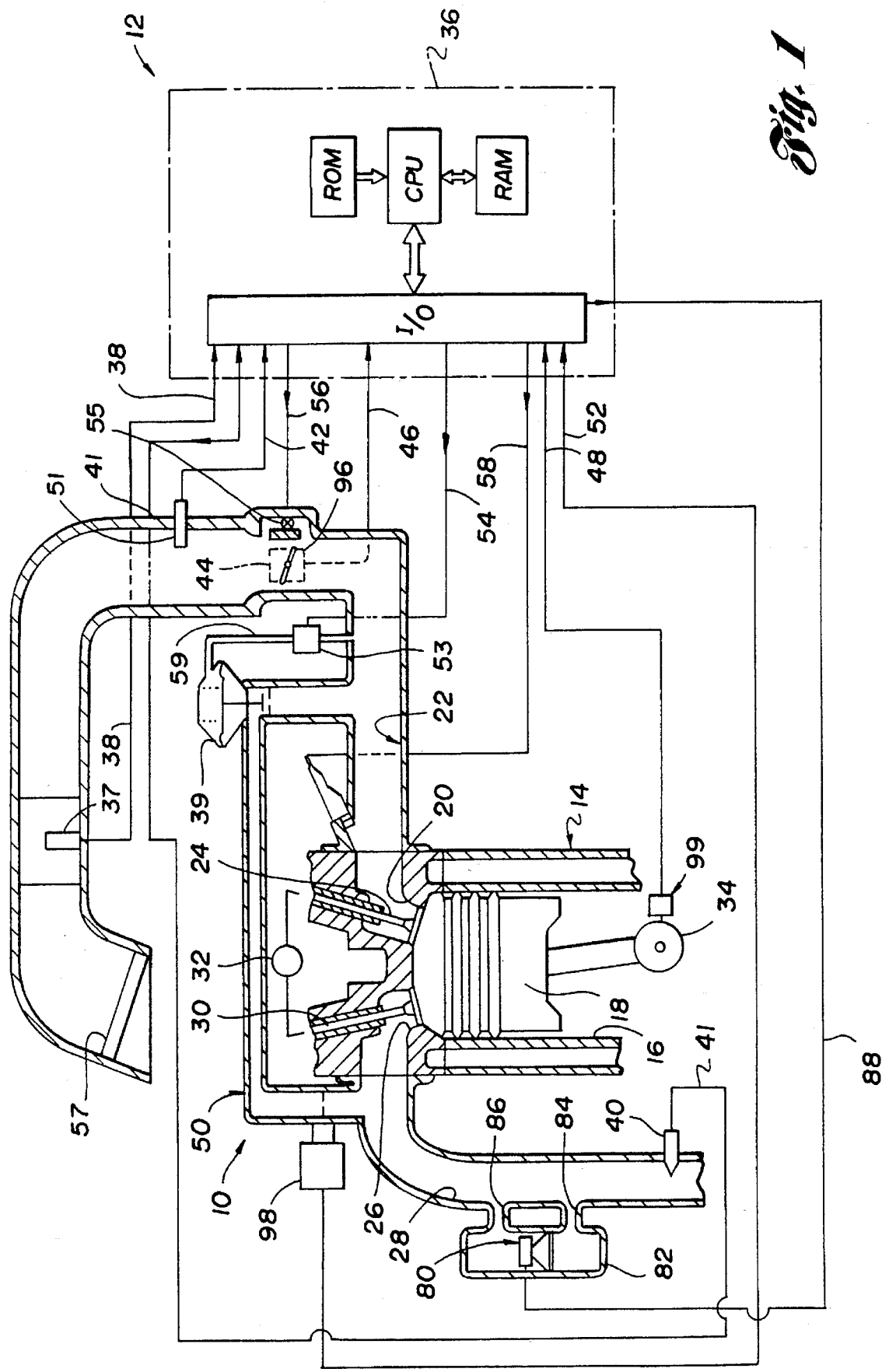
FIG. 1 is a diagrammatic view of structural features of an internal combustion engine employing an emission control according to the present invention.

Referring first to FIG. 1, a single cylinder combustion circuit 10 of an internal combustion engine 12 is thereshown comprising a cylinder block 14 defining a cylinder 16 and carrying a piston 18. Although a reciprocating piston arrangement is shown in FIG. 1, it is to be understood that other forms of internal combustion engine can also be modified to include controls according to the present invention. In any event, the cylinder 16 communicates through an intake port 20 with an intake passage 22 in response to movement of an intake valve 24. Similarly, an exhaust port 26 couples the cylinders 16 with an exhaust passage 28 in response to opening and closing of the exhaust valve 30. The valves 24 and 30 are driven in a well known manner, for example, a camshaft timing control 32 whose operation corresponds with the crankshaft angle occupied by the crank pin 34 (diagrammatically representing the crankshaft) in FIG. 1.

Engine 12 is in part controlled by an electronic engine control (EEC) 36 receiving input from controls or sensors, and sending outputs to portions of the engine 12. A sensor 37 for measuring air mass flow downstream of filter 57 generates a responsive signal input at 38 via a sensor element, for example, a hot wire mass air flow sensor. An exhaust gas oxygen sensor 40 delivers a signal 41, and a temperature sensor 51 provides an sensor signal 42 input to the electronic engine control 36. In addition, the position of the butterfly valve 44 is measured by sensor 96 and indicated along signal line 46, responsive to throttle position. Crankshaft position is denoted by a transducer 99 coupled along signal line 48. The exhaust gas recirculation delta pressure in an exhaust gas recirculation passage 50 is sensed by a transducer 98 providing a signal 52.

In addition, the electronic engine control 36 provides output to a pressure control gate valve 53 that modulates the vacuum applied to the EGR valve 39 through vacuum signal passage 59 in response to signal line 54. The bypass flow control valve 55 at the throttle throat is controlled by a signal at 56. In addition, the fuel injection control signal line 58 governs fuel injected by the fuel injector to the intake passage 22.

In addition to the electronic controls above, it may be appreciated that a timing means 32 provided to operate the exhaust valve 30 and the intake valve 24 is also dependent upon crankshaft position, also known as crank angle. Conventionally, the timing means has been provided by mechanical linkages including cam shafts that position the valves dependent upon the crank angle. Nevertheless, it will be understood that other controls such as electronic control of the valve timing does not depart from the scope of the present invention.

The pressure of the fluid in the passage 22 increases as the valve 24 opens and the piston 18 descends into the cylinder. As is well known, the bypass 55 in the throttle body 41 permits sufficient air flow through the throttle body during idle, even when the butterfly valve 44 is closed, so that the engine maintains sufficient air supply during idling. Of course, a restriction or closing of the valve 55 in the bypass could limit or lower the pressure of air in the intake passage 22. In addition, opening or closing of the EGR gate 39 may also affect the pressure in the intake passage 22.

In addition, the exhaust gas pressure in the exhaust passage 28 increases as the piston moves upwardly in the cylinder and forces the combustion gases to pass through the open valved port 26. In addition, during an overlap period the exhaust valve 30 remains open before closing and the intake valve 24 opens before the piston 18 begins its descent to draw air in from the intake passage 22. The overlap improves the flow of combustion product gases out of the cylinder 16 and improves the flow of fresh fuel-air mixture for combustion into the cylinder through the intake port 26. Unfortunately, the threat that a large of amount of unburnt hydrocarbons will be released at the end of the piston's stroke near top dead center can impede the manufacturers' ability to meet the reduced emission standards that are being set for the industry, even while utilizing the advantage of the horsepower available from the engine in order to improve economy of fuel use.

Figure 2:
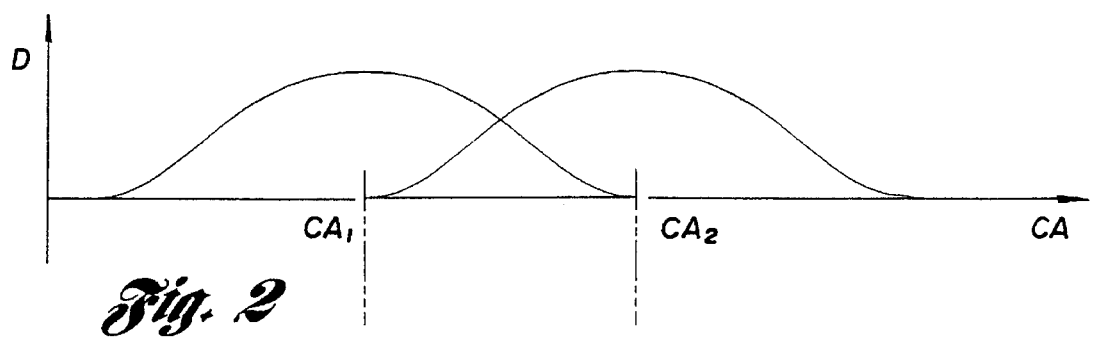
FIG. 2 is a graphic representation of lift versus crank angle ported valve opening and closing and demonstrating an overlap in the intake and exhaust port opening.
Figure 3:
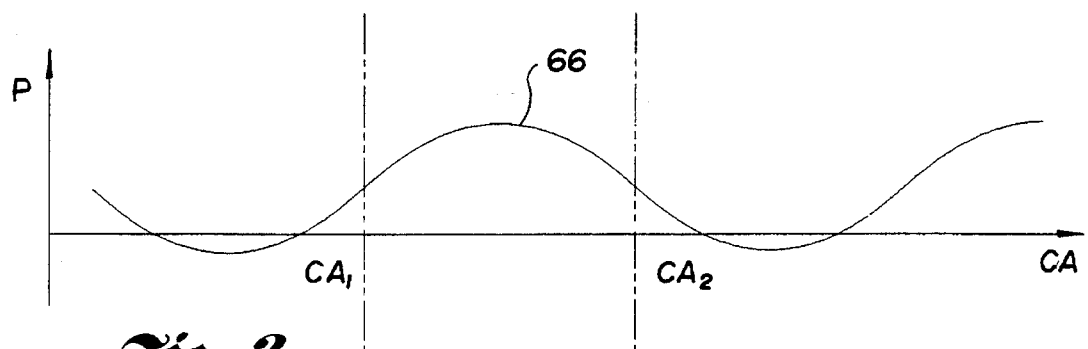
FIG. 3 is a graphic representation of a pressure change versus crank angle induced at the exhaust port during the overlap period shown in FIG. 2.
Figure 4:
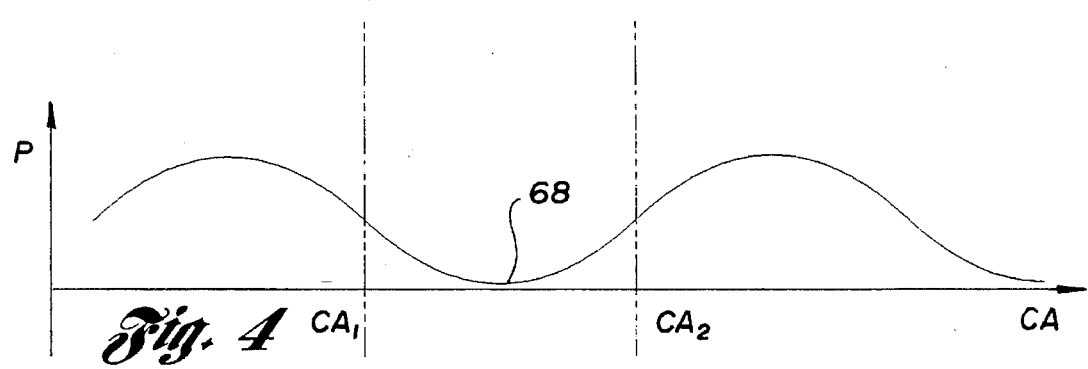
FIG. 4 is a graphic representation of pressure change versus crank angle induced at the intake port during the overlap period shown in FIG. 2.

Referring now to FIG. 2, the relative opening of the exhaust valve 30 is demonstrated by curve 62 in relation to the opening of the intake valve 24 in the port is represented by curve 64. The displacement of the valves 30 and 24 are both open for duration $CA_1$–$CA_2$, referred to as the valve overlap. In the period of valve overlap $CA_1$–$CA_2$, FIG. 3 demonstrates that the positive pressure pulse in the exhaust passage 28 would assist the retention of the hydrocarbon emissions attempting to exit from the exhaust port 26 while the valve 30 remains open. Thus the fluid pressure represented in the time period $CA_1$–$CA_2$ in FIG. 3 is consistent with fluid flow control according to the present invention. Likewise, FIG. 4 demonstrates that a pressure decrease in the intake passage 22 would be useful in retaining hydrocarbons within the cylinder 16 rather than passing them through to the exhaust passage 28 during the valve overlap $CA_1$–$CA_2$. Of course, either or both of pressure variations shown in FIGS. 3 and 4 can be practiced in accordance with the present invention.

Figure 5:
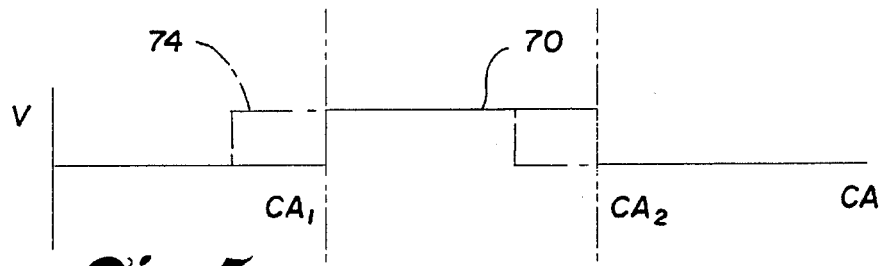
FIG. 5 is a graphic representation of a drive signal voltage versus crank angle from a control to produce the result shown in FIG. 3.

FIG. 5 demonstrates that a positive pressure pulse required in the exhaust passage 28 according to FIG. 3 may be provided by positive voltage signals 70 generating positive press output from a transducer such as the acoustic transducer 80 shown in FIG. 1. In particular, FIG. 1 shows transducer 80 carried in a housing 82. The housing 82 communicates through two ports 84 and 86 with the exhaust passage 28. Preferably, each port communicates with a chamber facing one side of the diaphragm of the transducer 80. The transducer receives voltage signal 70 along signal line 88. Moreover, the signal 70 is appropriately faced so that the positive acoustic pulse from the transducer 80 is delivered to the output port 26 during the overlap period $CA_1$–$CA_2$. Accordingly, when the transducer 80 is displaced along the exhaust passage 28 away from the port 26, the signal 70 may be appropriately phased as shown in phantom line at 74 in FIG. 5 so that the acoustic pulse arrives at the port during the appropriate time period.

Figure 6:
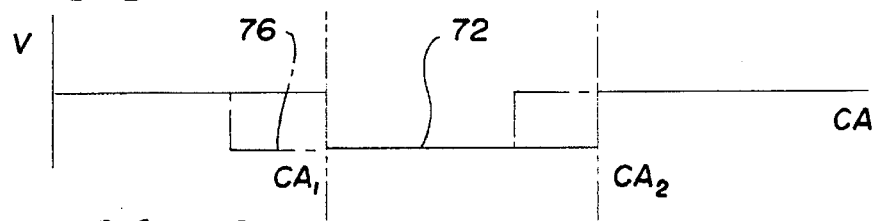
FIG. 6 is a graphic representation showing a drive signal voltage versus crank angle from a control for generating the output shown in FIG. 4.

In FIG. 6, a voltage signal 72 is thereshown for actuating the air bypass valve control along the signal line 56. In particular, the negative pulse of the signal 72 may generate a closure of the bypass valve 55 shown in FIG. 1. Moreover, such a closure may cause a pressure decrease in the intake passage 22 to retard the exhaustion of hydrocarbons from the cylinder 16. In addition, as shown in FIG. 1, the bypass valve 55 is displaced a distance along the length of the intake passage 22 from the port 20 and an appropriate phasing such as a lead or a lag on the signal 72 along line 56 as designated in phantom line at 76 in FIG. 6. Nevertheless, other affects upon the intake passage 58 such as the EGR valve 39 or back pressure increase in the exhaust passages 28 may also function according to the present invention to restrict a removal of hydrocarbons during the crank angle sector corresponding to $CA_1$–$CA_2$ valve overlap.

Having thus described the present invention, many modifications thereto will become apparent to those skilled in the art to which it pertains without departing from the scope and spirit of the present invention as defined in the appended claims.

We claim:

1. A method for reducing hydrocarbon emissions exhausted from an internal combustion engine cylinder, wherein the cylinder communicates through valved ports with intake and exhaust passages;

overlapping the opening and closing of said valved parts to improve flow of air fuel mixture into the cylinder and exhaust flow out of the cylinder;

timely introducing at least one of a) a pressure decrease at said intake passage during said overlap and b) a pressure increase in said exhaust passage during said overlap to reduce the hydrocarbon emissions released to the exhaust passage during said overlap duration of crank angle.

2. The invention as defined in claim 1 wherein said introducing step comprises decreasing fluid pressure in said intake passage.

3. The invention as defined in claim 2 wherein said fluid pressure comprises decreasing fluid flow through an air bypass valve in a manifold.

4. The invention as defined in claim 3 wherein decreasing fluid flow comprises driving an air bypass valve by an electrical signal phase adjusted with respect to said overlap.

5. The invention as defined in claim 2 wherein said decreasing fluid pressure comprises transmitting an acoustic pulse in said intake passage.

6. The invention as defined in claim 1 wherein said introducing step comprises increasing fluid pressure in said exhaust passage.

7. The invention as defined in claim 6 wherein said increasing fluid pressure step comprises introducing an acoustic pressure pulse at said valved exhaust port.

8. The invention as defined in claim 6 wherein said increasing step comprises opening an EGR valve.

9. The invention as defined in claim 8 wherein said EGR valve is driven by an electrical signal phase adjusted with respect to said overlapping.

10. An internal combustion engine having at least one cylinder at least one valved intake port for fluidly coupling each cylinder to an intake passage, at least one valved exhaust port for selective coupling of said cylinder to an exhaust passage, and timing means for actuating the valves in the intake and exhaust ports, and comprising:

a control overlapping the closure of the valve exhaust port and opening of the valved intake port for a timely predetermined duration; and a pressure control for introducing at least one of a pressure increase in at said exhaust port and a pressure decrease at said intake port during said overlapping duration to reduce late hydrocarbon emissions.

11. The invention is defined in claim 10 wherein said pressure control comprises an acoustic transducer.

12. The invention is defined in claim 11 wherein said engine includes a crankshaft and further comprising a drive circuit generating a drive signal in response to predetermined crankshaft positions.

13. The invention is defined in claim 10 wherein said control comprises a camshaft.

14. An apparatus for reducing release of hydrocarbon emissions from a cylinder of an internal combustion engine, and said engine having an exhaust passage coupled by a valved exhaust port to the cylinder and an intake passage coupled by a valved intake port, and further having a piston coupled to a crankshaft for reciprocating movement in said cylinder, and comprising:

timing means for opening and closing each of said exhaust port and said intake port, wherein said timing means includes a cam shaft for maintaining an overlapped opening of said intake valved port and said exhaust valved port throughout a predetermined rotational sector of crankshaft angle, and an acoustic pressure adjuster in at least one of said intake passage and said exhaust passage for respectively decreasing and increasing the pressure in said exhaust passage and said intake passage respectively throughout said predetermined rotational sector of crankshaft angle.

* * * * *